United States Patent
Kayser

[15] 3,682,267
[45] Aug. 8, 1972

[54] FUEL VALVE LOCKING DEVICE

[72] Inventor: Allan J. Kayser, 345 South Race St., Denver, Colo. 80209

[22] Filed: Nov. 3, 1970

[21] Appl. No.: 86,405

[52] U.S. Cl. .....................180/114, 70/179, 70/185, 70/242, 137/384.4
[51] Int. Cl. .............................................B60k 27/08
[58] Field of Search ..........180/114, 82; 70/242, 185; 137/384.2, 384.4, 384.6, 384.8

[56] References Cited

UNITED STATES PATENTS

| 1,366,229 | 1/1921 | White | 137/384.2 |
| 1,374,621 | 4/1921 | Wicker | 70/242 X |
| 2,906,284 | 9/1959 | Lau | 180/114 X |

FOREIGN PATENTS OR APPLICATIONS

| 976,852 | 12/1964 | Great Britain | 137/384.6 |

Primary Examiner—Robert J. Spar
Attorney—Reilly and Lewis

[57] ABSTRACT

A three-position lock is disposed between a fuel valve and solenoid in a diesel engine and is selectively movable either to a closed position interrupting the flow of fuel from the fuel pump to the engine, an open position permitting uninterrupted flow of fuel to the engine, or to a neutral position permitting normal operation in direct response to energization or deenergization of the solenoid.

13 Claims, 5 Drawing Figures

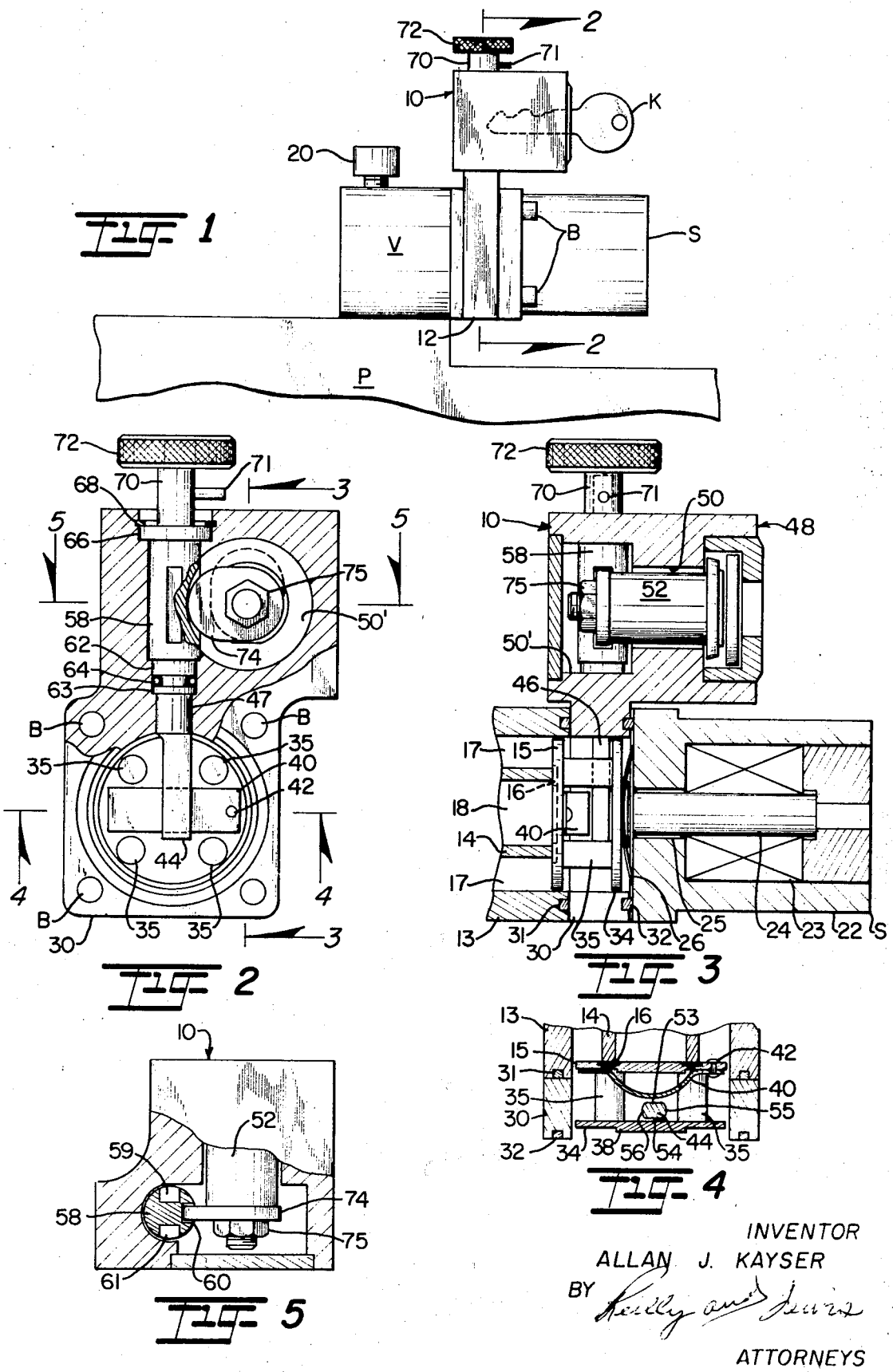

FUEL VALVE LOCKING DEVICE

This invention generally relates to locking devices, and more particularly relates to a novel and improved fuel pump locking device which is specifically adaptable for use in diesel engines.

The theft of motor vehicles has become an acute problem, especially the theft of large trucks and accompanying loss of valuable cargo or destruction of the truck itself. Anti-theft devices that have been devised to thwart the unauthorized taking of vehicles have not for the most part proven to be effective deterrents. Conventionally, the approach has been either to place complicated electrical circuitry in the ignition or electrical system or to incorporate mechanical locking devices within the fuel line. Typically, however, locking devices presently in use have been rather costly and complicated and have necessitated major modifications or replacement of existing parts either in the electrical or control system or the fuel supply to the engine and as mentioned, have not been effective deterrants to theft.

It is therefore highly desirable to provide a fail-safe locking device for diesel engines which can be readily incorporated into the existing fuel supply system for the engine without necessitating major modification or change and which will operate independently of the electrical system to regulate the flow of fuel to the diesel engine. In many diesel engines, the fuel valve which regulates the flow of fuel from the fuel pump to the engine is opened or closed by a solenoid which is axially aligned with one end of the fuel valve. It is therefore specifically proposed to provide a locking device which is capable of locking the valve in a closed position independently of energization or de-energization, is capable of locking the valve in an open position as an aid to emergency starting, and is further capable of movement to a neutral position which will permit normal operation of the solenoid and valve.

It is therefore an object of the present invention to provide for a positive, direct, foolproof locking device for the fuel supply system in motor vehicles.

It is another object to provide for a fail-safe locking device for diesel engines and specifically wherein a three-position lock is arranged between a solenoid and fuel valve to alternately lock the valve either in an open or closed position or in a neutral position permitting normal operation of the valve.

It is a further object of the present invention to provide a novel and improved locking device which will effect positive locking of the fuel supply system in a diesel engine independently of the electrical or control system to serve as an effective anti-theft device.

It is an additional object of the present invention to provide for a fuel pump locking device which is comprised of a minimum number of parts, easily installed with minimum modification required to the existing parts in the fuel supply system of a diesel engine, the locking device requiring a minimum of maintenance and being highly dependable in use.

The present invention is best exemplified by describing its use in controlling the flow of fuel to a diesel engine and in such a way as to interrupt the flow of fuel between a fuel valve and a solenoid or electromagnetic actuating member which is conventionally used as a remote control for opening and closing the valve. In accordance with the present invention, a valve control assembly is interpositioned between the end of the fuel valve and the axially aligned end of the solenoid including a position control member which is rotatable to move the valve control assembly between an open, neutral and closed position, and the assembly is held in a selected position by a key-operated lock associated with the position control member. Specifically, the valve control assembly includes spaced plates disposed normally to be freely movable between the solenoid and fuel valve and are locked in a desired position by a rotatable position control member which is in turn locked against rotation by a tumbler-type lock. The tumbler lock is provided with a male element which is rotatable into a selected one of a series of three slots on the position control member to lock the position control member at the desired setting.

The above and other objects of the present invention will become more readily appreciated and understood from a consideration of the following detailed description when taken together with the accompanying drawings, in which:

FIG. 1 is a side elevational view of a preferred form of locking device shown in assembled relation between the fuel valve and solenoid of a diesel engine.

FIG. 2 is a cross-sectional view taken about lines 2—2 of FIG. 1.

FIG. 3 is a sectional view taken about lines 3—3 of FIG. 2.

FIG. 4 is a cross-sectional view taken about lines 4—4 of FIG. 1 through the end of the position control member; and FIG. 5 is a view partially in section illustrating the interrelationship between the key-operated lock and position control member in accordance with the present invention.

Referring in more detail to the drawings, there is shown by way of illustrative example a preferred form of locking device 10 interpositioned between a fuel valve V and solenoid S of a diesel engine, not shown. For example, the diesel engine may be of the type manufactured and sold by Cummins Engine Company, Inc. of Columbus, Indiana, such as Model NHC–250, NHTC–270 or NTC–335. In the conventional engine, the fuel valve and solenoid are directly interconnected above the fuel pump represented at P wherein a solenoid to be hereinafter described in more detail functions to control opening and closing of the valve to control the passage of fuel from the fuel pump into the engine cylinders.

Conventional operation of the fuel valve V and solenoid S can be best seen from FIG. 3 wherein the valve V and solenoid S are separated by the valve control assembly 12 of the locking device 10. Here, the fuel valve V comprises an outer cylindrical casing 13 and an inner tubular valve element 14 disposed in spaced concentric relation within the casing 13. A valve seat defined by a circular plate or disc 15 is disposed across one end of the valve element 14 and is provided with an annular seating surface in the form of a circular seal 16 positioned within a groove on one side of the disc facing and in alignment with the end of the valve element 14. The flow of fuel between the pump and engine cylinders passes through the outer annular space 17 between the casing 13 and valve 14, around the end of the valve element 14 and into the central chamber 18, which in a manner not shown communicates with the outlet 20, shown in FIG. 1, for passage to the engine. In turn, the solenoid S includes an outer housing 22 for solenoid coil 23 and a core 24 arranged concentrically within the housing with the core 24 aligned with a central opening 25 in one end of the housing in facing relation to the valve V, and a disc spring 26 is disposed across the end of the housing over the opening 25. In the absence of the position control assembly 12, the solenoid housing would be secured directly to the opposed facing end of the valve casing 13 so that the disc spring normally would bias the valve seat 15 into a closed position against the end of the valve element 14; and activation of the solenoid would draw the seat 15 away from the valve to permit valve opening for fluid flow into the inner space 18. Accordingly, in conventional practice, the valve is movable from a closed and neutral position only to regulate passage of fuel from the fuel pump to the engine.

In accordance with the present invention, the fuel locking device 10 has a valve control assembly 12 interpositioned between the facing ends of the solenoid housing 22 and the valve casing 13 in such a way as to lock the valve seat either in a closed position against the valve 14 to prevent passage of fuel to the engine, an open position holding the seat open for free flow of fuel under emergency conditions, or a neutral position permitting free movement of the valve seat 15 under the direct influence of the core 24. To this end, the valve control assembly is made up of a generally circular sleeve or casing 30 dimensioned to correspond in diameter with that of the valve casing 13 and is fastened by suitable means such as the screws B between the valve casing 13 and solenoid housing 22 with the inner wall surface of the sleeve 30 forming an axial continuation of the casing 13. Annular seals 31 and 32 may be suitably positioned between abutting end surfaces of the sleeve 30, casing 13 and housing 22. The valve seat 15 is dimensioned to be slidable along the inner wall surface of the casing 13 and is attached in spaced parallel relation to a circular extension plate 34 by means of a plurality of spacer rods 35, there being preferably four spacers at equally spaced intervals between the opposed, facing surfaces of the valve seat 15 and extension plate 34 which serve to space the seat 15 and extension plate 34 apart a distance corresponding to the width of the sleeve 30. In addition the extension plate 34 is provided with a generally circular, centrally located raised surface 38 which is aligned with the end of the core 24 and normally engaged by the central bowed portion of the spring 26 to urge the valve seat 15 against the end of the valve.

A leaf spring 40 is anchored at one end by a rivet 42 to the surface of the seat 15 opposite to the seal 16 and is bowed at its center axially away from the seat toward the opposite extension plate 34 for engagement by a position control member 46. Member 46 has a locking dog or cam 44 which extends transversely into the space between the spring 40 and plate 34 which serves to control movement of the valve control assembly 12 between the open and closed positions in a manner now to be described.

Referring to FIGS. 2 and 3, the locking cam 44 forms a forward continuation of the position control member 46, the latter being in the form of a cylindrical shank which extends through a main bore or groove 47 passing completely through the main body 48 of the locking device. The main body 48 is solid except for the shank-receiving passage 47 and an intersecting transverse passage 50 which receives a tumbler lock 52, the latter serving to lock the member 46 and associated locking cam 44 in a predetermined setting with respect to the valve control assembly 12.

Considering in more detail the specific construction and arrangement between the cam 44 and cylindrical shank, the locking cam 44 is reduced in size and effect from the cylindrical shank, the cam having relatively flat, spaced parallel sides 53 and 54, a rounded surface 55 forming an extension of the surface of the shank and an opposite rounded surface 56 which is offset from the external surface of the shank, as best seen from FIG. 2. Generally considering the function of the locking cam, in the disposition shown in FIG. 4, the locking cam is in a neutral position with the flat sides spaced between the inner surface of the extension plate 34 and the surface of the spring 40 so that the valve control assembly is freely movable toward and away from the closed position against the valve element 14 under the direct influence of the core 24. By rotating the locking cam counterclockwise the rounded surface 55 of the cam is movable against the bowed central surface of the spring 40 to yieldingly urge the seat 15 into a closed position against the valve element 14; or by rotation in a clockwise direction from the position shown in FIG. 4 the rounded surface 55 is movable against the inner surface of the extension plate 34 to urge the valve seat 15 away from the end of the valve element 14 thereby locking the valve control assembly in an open position with respect to the valve notwithstanding energization of the solenoid against the urging of the disc spring 26.

The position control member 46 has an intermediate portion 58 which, as shown in FIG. 5, is provided with a series of three, circumferentially spaced, external slots 59, 60 and 61, and the slots are aligned across the open side of the passage 50 for a purpose to be described. A pair of axially spaced, inwardly stepped shoulders 62 and 63 immediately ahead of portion 58 accommodate an O-ring seal 64 in the groove formed between the shoulders. An enlarged shoulder portion 66 at the opposite end of the portion 58 is seated in a counterbore at the entrance to the opening 47, and the member 46 is locked in place by a snap ring 48 inserted into a groove in the wall of the counterbore. A sleeve portion 70 extending outwardly through the counterbore from attachment by lock screw 71 to the reduced end of the member 46 is provided with a knurled control knob 72 to permit manual rotation of the position control member 46 and its locking cam 44 into either of the desired positions.

In order to lock the member 46 with its locking cam at the desired setting, the tumbler lock 52 is provided with a cam 74 at its forward end which is movable within the enlarged recess 50' at the inner end of the passage 50. Specifically, the cam 74 is rotatable about central shaft 75 of the lock, in response to turning of a key represented at K within the lock, to advance from a position, shown dotted in FIG. 2, wholly within the enlarged recess 50' to a position as shown in full within one of the three control slots 59, 60 and 61 in order to lock the member 46 against the rotation. The tumbler lock 52 may be of conventional construction and for example may be a model H73 lock manufactured and sold by Hurd Manufacturing Co. of Greenville, Tenn.

In use, it will be seen that the fuel locking device is controllable independently of the electrical or starting system for the diesel engine. Thus, assuming that the lock 52 is opened to advance the cam element 74 to the dotted line position shown in FIG. 2, the position control member 46 including the locking cam 44 is freely rotatable by manual rotation of the control knob 72 to either of the three desired control settings. Although not shown, suitable indicia may be provided on the external surface of the main body of the locking device opposite the control knob to indicate the three positions, "OPEN", "CLOSED", "NEUTRAL", for turning the control member 46 to a position aligning the slot for free passage of the cam 74 into the slot. Assuming that the engine is to be locked when the vehicle is at rest, the position control member 46 would be rotated to a position causing the surface 55 of the locking cam to engage the spring element 40 thus yieldingly urging the valve seat against the valve element. Yielding engagement of the locking cam with the spring will thus minimize wear of the seal 20 against the valve element but close the valve under sufficient closing pressure to prevent flow of fuel and unauthorized starting of the vehicle when unattended. When the vehicle is to be started, the key is inserted into the lock 52 and turned to rotate the cam to its out-of-the-way position and permit the control member 46 to be rotated to the neutral position as shown in FIG. 4. Once again, the cam 74 is locked in the slot provided to secure the locking cam 48 in position against accidental turning or rotation when the vehicle is operated. In the alternative, in the absence of a battery or other emergency starting conditions, the control member 46 may be advanced to a position causing the locking cam to engage the extension plate and hold the valve in a full open position thereby permitting free flow of fuel through the valve.

While the locking device of the present invention has been described specifically with reference to its control of a solenoid-operated fuel valve in a diesel engine, its ready conformability and application to the control of other fuel valves will be readily apparent as well as its use in other equipment requiring similar anti-theft protection.

It is therefore to be understood from the foregoing description that various changes and modifications may be made therein without departing from the spirit and scope of the invention as defined by the appended claims.

What is claimed is:

1. In a motor vehicle wherein a fuel supply passage for delivery of fuel to an engine is provided with a valve member disposed in the passage and a valve seat movable toward and away from the valve member to control the supply of fuel to the engine, the combination therewith of:

valve closure control means including an extension plate interconnected in spaced parallel relation to the valve seat and movable with the valve seat toward and away from the valve member to close and open the fuel passage, position control means extending transversely into the space between the valve seat and extension plate being movable between a position engaging the valve seat to hold the seat closed against the valve member and a position engaging the extension plate to hold the valve seat open with respect to the valve member and permit uninterrupted flow of fuel through the fuel passage, and locking means engageable with said position control means to lock said position control means in one of said open and closed positions.

2. In a motor vehicle according to claim 1, said position control means being further characterized by yieldingly engaging the valve seat to retain it in the closed position against the valve.

3. In a motor vehicle according to claim 1, said position control means being further movable to a neutral position spaced between the valve seat and extension plate to permit movement of the valve seat and extension plate between the open and closed positions independently of said position control means.

4. In a motor vehicle according to claim 1, said position control means including a cylindrical shank portion provided with longitudinal slots therein, said shank portion being rotatable to advance said position control means between the open and closed positions, and said locking means provided with a locking element movable into one of the slots on said cylindrical shank to lock said position control means in a selected position with respect to said valve closure control means.

5. In a motor vehicle according to claim 4, said locking means being further characterized by a key actuated lock having a rotatable cam element thereon defining the locking element which is movable into a selected one of the slots on said cylindrical shank.

6. In a diesel engine having a fuel valve interpositioned between a fuel pump and engine cylinders wherein a solenoid is axially aligned with the end of a tubular valve member and is selectively energized in regulating the flow of fuel between the fuel pump and engine, the combination therewith of a locking device comprising:

valve control means interpositioned between the facing ends of said solenoid and the valve member and normally arranged for free slidable movement between the valve member and the plunger, said valve control means including a valve seat and an extension plate in spaced but connected relation to the valve seat, a rotatable position control member including a locking cam at its free distal end projecting transversely into the space between the extension plate and the valve seat, said locking cam being rotatable between a closed position engaging the valve seat to hold same against the valve member to interrupt the flow of fuel to the valve to the engine and a neutral position permitting free slidable movement of the valve control means in direct response to energization and de-energization of the solenoid, and locking means engageable with said position control member to selectively retain said locking cam in either of said closed or distal positions.

7. In a diesel engine according to claim 6, said position control member further including a cylindrical shank provided with manually rotatable means at one end opposite to the locking cam for manual rotation of said locking cam between the closed and neutral positions.

8. In a diesel engine according to claim 6, said locking cam being further movable to an open position engaging said extension plate to hold said valve control means open in spaced relation to the end of said valve member for uninterrupted flow of fuel through the fuel passage.

9. In a diesel engine according to claim 8, said position control means further including a cylindrical shank with said locking cam in offset relation at the free distal end of said cylindrical shank for rotation between the open and neutral positions and for rotation to an open position holding said valve control means away from the end of said valve member.

10. In a diesel engine according to claim 9, said cylindrical shank provided with circumferentially spaced, longitudinally extending slots on its external surface, and said locking means being defined by a rotatable locking member extending transversely of said cylindrical shank and having a rotatable locking element at one end movable into a selected one of said slots to retain said locking cam in a selected position with respect to said valve control means.

11. In a motor vehicle wherein a fuel supply passage is provided for delivery of fuel to an engine, the combination therewith of:
a fuel valve provided with a tubular valve member disposed concentrically within the fuel passage to regulate the flow of fuel between the annular space outside of the valve member and the space within the valve member; and
a locking device including a body portion provided with an extension sleeve interpositioned between said fuel valve and solenoid-operated plunger to define an axial extension of said valve casing and the flow passage therein, valve control means arranged for slidable movement within said extension sleeve axially between the valve member and solenoid, said valve control means including a valve seat in facing relation to the end of the valve member and an extension plate in spaced but connected relation to the valve seat, said extension plate disposed in facing relation to the solenoid core, a rotatable position control member including a cylindrical shank portion extending through a shank-receiving passage in said body and including a locking cam at its free distal end projecting through said extension sleeve into the space between said valve seat and extension plate, manual control means on said cylindrical shank portion rotatable to advance said locking dog between a closed position engaging said valve seat to hold same against the valve member to interrupt the flow of fuel through the fuel passage, an open position engaging the extension plate to hold the valve seat open with respect to the valve member and permit uninterrupted flow of fuel through the fuel passage, and a neutral position spaced between said valve seat and extension plate to permit free slidable movement of said valve control means, and a locking member extending through a passage in said body transversely of said cylindrical shank and selectively engageable with said cylindrical shank to retain said locking cam in a selected one of said open, closed and neutral positions.

12. In a motor vehicle according to claim 11, said valve seat provided with a spring element in facing relation to said locking cam, and said locking cam engaging said spring element in the closed position to yieldingly urge said valve seat against the valve member.

13. In a motor vehicle according to claim 11, said cylindrical shank provided with circumferentially spaced, longitudinally extending slots opposite to said locking member, and said locking member being defined by a key-operated lock provided with a rotatable cam at its inner end being movable into an aligned slot on said cylindrical slot to selectively retain said locking cam in one of the open, closed or neutral positions.

* * * * *